E. McAllister,
Wind Wheel.

Nº 67,664.          Patented Aug. 13, 1867.

Witnesses:
J. C. Lockwood
John Browne

Inventor:
Edward McAllister
by Jas. Cowles
Atty

United States Patent Office.

EDWARD McALLISTER, OF PLAINFIELD, ILLINOIS.

Letters Patent No. 67,664, dated August 13, 1867.

---

IMPROVEMENT IN WINDMILLS APPLIED TO RAISING WATER.

---

*The Schedule referred to in these Letters Patent and making part of the same.*

---

TO WHOM IT MAY CONCERN:

Be it known that I, EDWARD McALLISTER, of Plainfield, in the county of Will, and State of Illinois, have invented a new and useful Improvement in Windmills; and I do hereby declare that the following is a full, clear, and exact description of the construction and operation of the same, reference being had to the annexed drawings, making a part of this specification.

The nature and object of my invention are to construct a windmill so arranged that the weight of the water will regulate the wind-wheel, thus causing the water to be elevated when the trough is empty, or partially so, and when the trough is full causing the pumping to cease, which renders it a convenient machine for watering cattle, or for other purposes.

Figure 1:
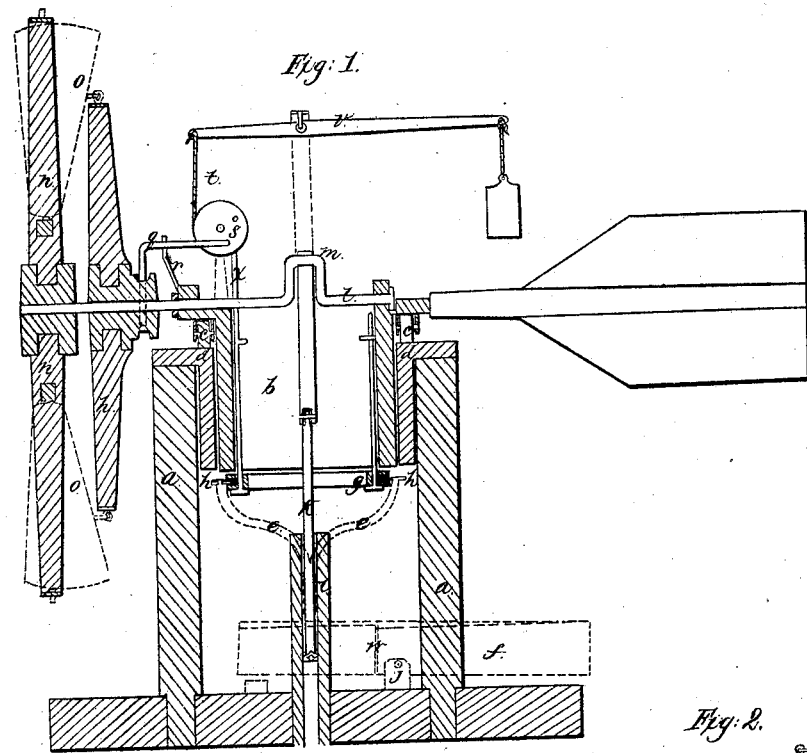
Figure 1 is a vertical section.
Figure 3:
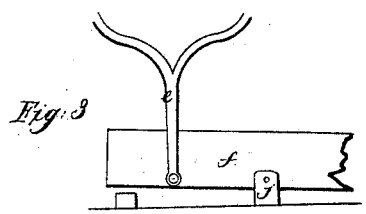
Figure 3 is a section showing the connection of the rod from the water-trough to the operative parts of the windlass above.
Figure 2:
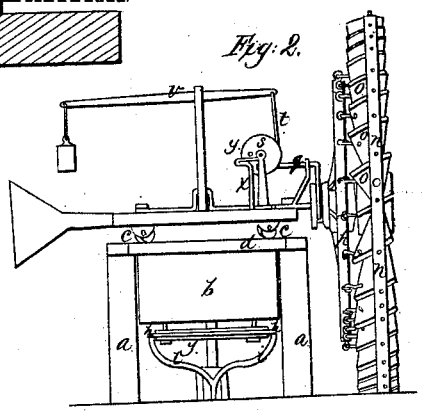
Figure 2 is an upright view.

$a\ a$ are posts supporting the windmill; $b$ is the revolving tub supported upon the wheels $c\ c\ c\ c$, which turn upon the circular tread $d\ d$. $e$ is a connecting-rod leading from the trough $f$ up to the circular part $g$; it is attached in two prongs to a ring working in a recess which surrounds the circular part $g$. The trough $f$ plays upon the fulcrum $j$, which is situated at a little one side of the centre. $i$ is the pump, and $k$ is the pump-rod, which is connected to the shaft $l$ of the windmill at the crank $m$. $n\ n$ is the wind-wheel with its blades $o\ o\ o$. The blades $o\ o\ o$ are made to turn by being hung on a pivot. $p$ is a sub-wheel placed immediately back of the wind-wheel, and is connected to each and every blade $o$. This sub-wheel $p$ works freely on the shaft $l$. At the rear of the sub-wheel $p$ is the rod $q$, working in the recess in the hub; it works through the guide $r$, and is attached to the pulley-wheel $s$. $t$ is a rope, passing from the end of the lever $o$, and attached to the periphery of wheel $s$. $x$ is a rod passing from the circular part $g$ up through the tub $b$, and comes up by the side of pulley-wheel $s$, as shown in fig. 2, and works against the pin $y$.

The operation of my invention is as follows: As the wind causes the wind-wheel $n$ to revolve, which works the pump, the water passes into the trough $f$. This trough is divided by a partition. As the trough fills, the longer arm of the trough fills, and a greater weight being at one side of the fulcrum $j$ than at the other, the short end of the trough is lifted up, and as the rod $e$ is connected with this short arm it lifts the circular part $g$, which in turn lifts the rod $x$, and the rod $x$ coming in contact with the pin $y$, the pulley-wheel $s$ is turned partially around; this draws back the sub-wheel $p$, which turns the blades edgeways with the wind, and the pumping ceases. When the water in the long arm of the trough is exhausted the trough then assumes a horizontal position, the rod $x$ is lowered, and the trough, the lever $v$, and its weight, and the rope $t$, and the sub-wheel, are returned to their former position, and the blades are set to an angle with the wind, and pumping is resumed.

Having thus described the nature and operation of my invention, what I claim as new, and desire to secure by Letters Patent, is—

1. Governing the action of a windmill by the weight of the water pumped by an organized mechanism, substantially in the manner described.

2. Combining the trough $f$, connecting-rod $e$, circular part $g$, rod $x$, pulley-wheel $s$, and rod $q$, or their equivalents, substantially as and for the purpose shown.

EDWARD McALLISTER.

Witnesses:
   J. M. BROWNE,
     ALONZO C. ALLEN.